United States Patent [19]

Metz

[11] Patent Number: 4,484,473

[45] Date of Patent: Nov. 27, 1984

[54] MONITORING AND SIGNALLING TAPE HEAD APPARATUS

[75] Inventor: Walter Metz, Moosbrunn, Fed. Rep. of Germany

[73] Assignee: Metz-Mannheim GmbH, Mannheim, Fed. Rep. of Germany

[21] Appl. No.: 565,518

[22] Filed: Dec. 27, 1983

Related U.S. Application Data

[63] Continuation of Ser. No. 283,383, Jul. 15, 1981, abandoned.

[30] Foreign Application Priority Data

Jul. 15, 1980 [DE] Fed. Rep. of Germany ....... 3026677

[51] Int. Cl.³ ............... G01D 11/30; G01R 11/25; G08B 1/08
[52] U.S. Cl. ................... 73/432 AD; 73/722; 73/729; 324/73 AT; 324/117 H; 340/870.16
[58] Field of Search ............. 73/150 R, 432 AD; 340/870.11, 870.16, 870.31, 870.37, 688, 675; 324/73 AT

[56] References Cited

U.S. PATENT DOCUMENTS

| | | | |
|---|---|---|---|
| 2,427,213 | 9/1947 | Jewell | 340/870.31 |
| 2,464,191 | 3/1945 | Wen | 340/688 |
| 2,907,931 | 10/1959 | Moore, Jr. | 340/688 X |
| 3,156,989 | 11/1964 | Atkinson | 340/870.31 X |
| 3,185,976 | 5/1965 | Goyton | 340/688 |
| 3,293,914 | 12/1966 | Renoult | 340/870.37 X |
| 3,356,918 | 12/1967 | Williams | 340/870.31 X |
| 3,673,585 | 6/1972 | Tripp et al. | 340/870.31 X |
| 3,739,376 | 6/1973 | Keledy | 340/870.11 X |
| 3,851,320 | 11/1974 | Dahl | 340/870.31 X |
| 4,059,015 | 11/1977 | Satori | 340/870.31 X |
| 4,156,192 | 5/1979 | Schedrovitsky et al. | 340/870.31 X |

FOREIGN PATENT DOCUMENTS

| | | | |
|---|---|---|---|
| 2816209 | 10/1979 | Fed. Rep. of Germany | 340/870.11 |
| 2018995 | 10/1979 | United Kingdom | 340/870.11 |

Primary Examiner—Daniel M. Yasich
Attorney, Agent, or Firm—Herbert L. Lerner; Laurence A. Greenberg

[57] ABSTRACT

Monitoring and signaling device having at least one tape for indicating a measurement value of a measuring unit and for actuating a signal transmitter, the tape having a section thereof stretched over spatially separated guides and having a travel proportional to the measurement value and a coating effecting actuation of the signal transmitter which is displaceable parallel to the section of the tape extending between the guides, including an indicator for indicating a set nominal-value signaling point, the indicator and the signal transmitter being integrated in a signal head, and two bars extending parallel to the section of the tape and carrying the signal head, the section of the tape being displaceable past the signal transmitter in direct vicinity thereof and between the signal transmitter and the indicator.

33 Claims, 6 Drawing Figures

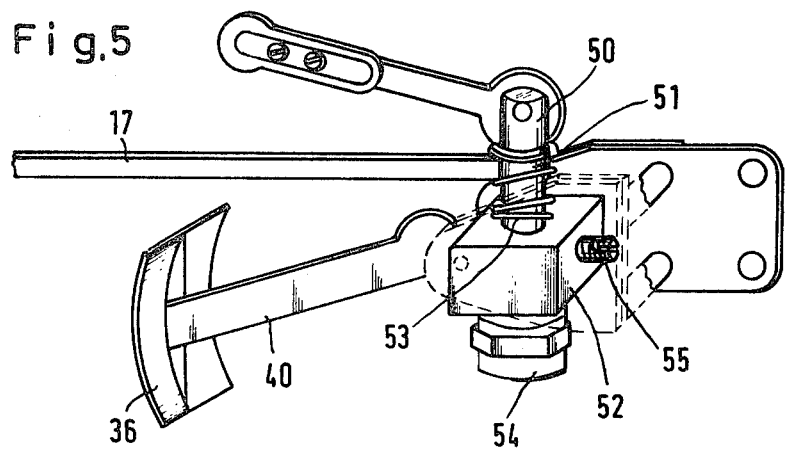
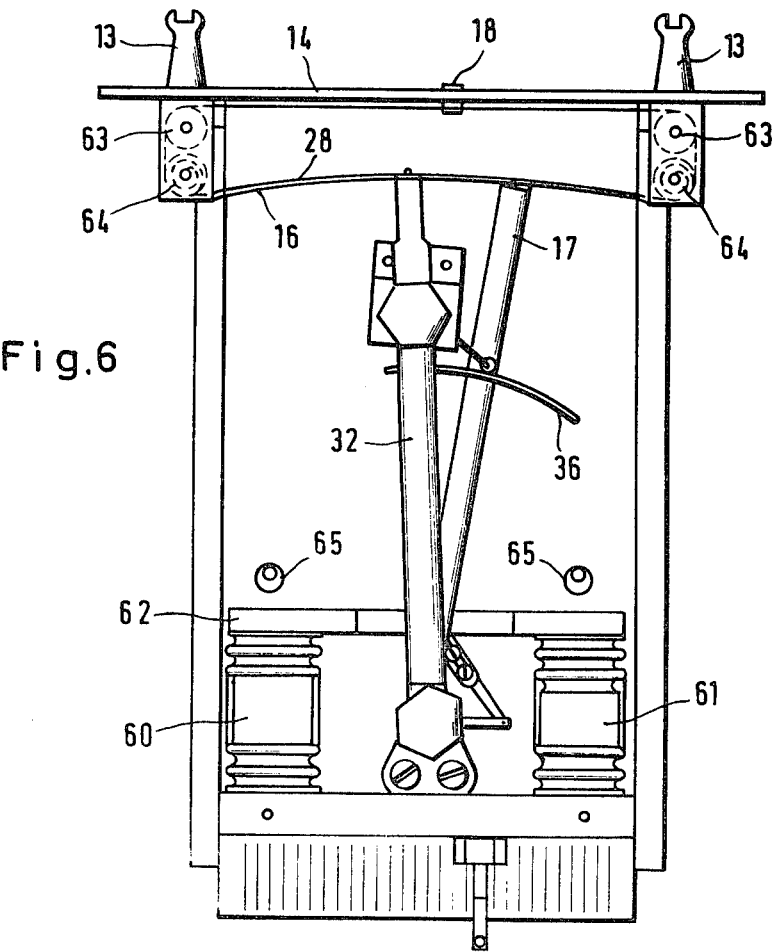

MONITORING AND SIGNALLING TAPE HEAD APPARATUS

This application is a continuation of application Ser. No. 283,383, filed July 15, 1981, now abandoned.

The invention relates to a monitoring and signaling device and, more particularly, to such device having at least one tape for indicating a measurement value of a measuring unit and for actuating a signal transmitter, the tape being stretched over spatially separated guides and having a travel proportional to the measurement value and a coating effecting actuation of the signal transmitter which is displaceable parallel to a section of the tape extending between the guides.

A measuring device of the foregoing general type has become known heretofore from the British Pat. No. 2,018,995, published Oct. 24, 1979, and the German Published Prosecuted Application counterpart, Oct. 18, 1979, laid open application SN (DE-AS) 28 16 209. The requirement for installing as many signal transmitters as possible in such a device in order to be able to perform the most varied control and monitoring tasks with one and the same device compels towards a more compact or crammed construction of the device because, in the course of miniaturization of such devices, the outer dimensions must be maintained in spite of the enlarged possibilities of application thereof. In addition thereto, the measurement accuracy of the device, especially the accuracy of the nominal-value setting or adjustment, should be improved as much as possible.

It is accordingly an object of the invention to provide a monitoring and signaling device of the foregoing general type witn an improved construction so that all of the foregoing requirements are met with a minimum space requirement in a most simple mechanical manner which is operationally reliable and largely free of maintenance or servicing.

With the foregoing and other objects in view, there is provided, in accordance with the invention, a monitoring and signaling device having at least one tape for indicating a measurement value of a measuring unit and for actuating a signal transmitter, the tape having a section thereof stretched over spatially separated guides and having a travel proportional to the measurement value and a coating effecting actuation of the signal transmitter which is displaceable parallel to the section of the tape extending between the guides, comprising an indicator for indicating a set nominal-value signaling point, the indicator and the signal transmitter being integrated in a signal head, and two bars extending parallel to the section of the tape and carrying the signal head, the section of the tape being displaceable past the signal transmitter in direct vicinity thereof and between the signal transmitter and the indicator.

The combination of the signal transmitter and the indicator in a signal head and the stringing or threading of this signal head on two rods or bars extending parallel to the tape ensure a space-saving disposition of the signal transmitter as well as a disposition thereof exactly set or adjusted to the duration of the operating period, the signal transmitter being adjustable to the desired nominal value in a relatively simple manner by being shifted or displaced.

In accordance with another feature of the invention, the signal head is displaceable in direction of the parallel bars and is formed with a through-bore having a polygonal cross section for receiving one of the bars therethrough, the signal head being also formed with a fork through which the other of the bars extends.

In accordance with a further feature of the invention, the signal head is formed with a slot extending from the through-bore to one of the outer sides of the signal head.

In accordance with an additional feature of the invention, the signal head is formed of synthetic material, and the bars of spring-hardened, non-corrosive material.

In accordance with an added feature of the invention, the signal head is formed of fibrous plastic material, and the bars of spring-hardened, non-corrosive and seamless tubes.

In accordance with yet another feature of the invention, there are provided respective means for holding the bars at upper and lower ends thereof, one of the means being formed with blind bores and the other of the means with through-bores for receiving the bars therein, and there are provided respective setscrews for fixing the bars in the through-bores.

In accordance with yet a further feature of the invention, a respective pair of the bars is disposed on each side of the tape section, and a plurality of the signal heads is slidable and snappable, respectively, on the bars.

In accordance with yet an additional feature of the invention, there is provided a measurement-value scale face operatively associated with the signal head, the indicator being disposed directly adjacent the scale face.

In accordance with yet an added feature of the invention, the measurement-value scale face is transparent and is disposed in front of the tape and a diaphragm exposing at least part of the tape section, the scale face having a measurement-value scale printed on a side thereof facing towards the diaphragm.

In accordance with still another feature of the invention, the diaphragm has at least two scale points printed thereof as adjusting aids when scales are exchanged during operation of the device.

In accordance with still a further feature of the invention, there is provided a housing front plate spaced from the scale face and defining with the latter a gap therebetween on each side, and an elastic covering disposed over the gap.

In accordance with still an additional feature of the invention, the elastic covering is a silicon hose.

In accordance with still an added feature of the invention, each of the silicon hoses has end portions wherein a pin is received for thickening the end portions, the thickened end portions being suspended in slots above and below the gap for fastening the respective silicon hoses.

In accordance with another feature of the invention, the pin is a setscrew.

In accordance with a further feature of the invention, the guides are formed of tubes of which at least two are resiliently mounted, the others of the guides being fixed by deformation in respective holders thereof.

In accordance with an additional feature of the invention, there are provided a plurality of the signal heads, each of the signal heads being separately connected by a nylon thread to a respective nominal-value lever carrying a nominal-value switch actuatable by the measuring unit, the nylon thread being fastened to the signal head and extending over the guides.

In accordance with an added feature of the invention, the nylon thread is looped multiply about the guides.

In accordance with yet another feature of the invention, the nominal-value lever has one end thereof mounted at a fixed center of rotation and, at the other end thereof, has a tubular member forming an axial extension thereof, the ends of the nylon thread being received in the tubular member and clampingly fixed therein by a deformable member so as to form an endless loop.

In accordance with yet a further feature of the invention, the tubular member is longitudinally shiftable in the nominal-value lever so as to vary the length and tension of the nylon thread.

In accordance with yet an additional feature of the invention, there is provided a threaded member holding the tubular member, the threaded member being displaceable in longitudinal direction on a threaded rod of the nominal-value lever against bias of a spring for finely adjusting the longitudinal shifting of the tubular member, and there is provided a lock nut on the threaded member for fixing the threaded member against unscrewing.

In accordance with yet an additional feature of the invention, there are provided means defining a control surface for actuating the nominal-value switch, the control surface means being disposed on a lever transfering a movement of the measuring unit to the tape.

In accordance with yet an added feature of the invention, the nominal-value switch has an actuating member with a ball spot-welded thereto which is in stroking engagement with the control surface, the ball having a surface facing toward the control surface which is undamaged by the welding.

In accordance with still another feature of the invention, there is provided an eccentric unit connecting the transfer lever to the measuring unit, the transfer lever having an adjusting member for receiving therein a respective lever arm of the eccentric unit, the lever arm being shiftable by a lock nut in the adjusting member against bias of a spring and being fixable against torsion by a setscrew.

In accordance with still a further feature of the invention, there is provided at least one axially twistable and eccentrically mounted pin for limiting travel of the measuring unit.

In accordance with still an additional feature of the invention, the eccentrically mounted pin has means for simultaneously serving as a fastening support for other components.

In accordance with still an added feature of the invention, the signal transmitter is a proximity indicator.

In accordance with still another feature of the invention, the proximity indicator comprises an induction coil.

In accordance with still a further feature of the invention, the proximity indicator comprises a Hall element.

In accordance with still an additional feature of the invention, there is provided an oscillator built into the signal head and electrically connected with the proximity indicator.

In accordance with still an added feature of the invention, there is provided an amplifier built into the signal head.

In accordance with another feature of the invention, the signal head has two outputs from which varying, further processable signals are conductible.

In accordance with a further feature of the invention, there is provided a control light for testing the functioning of electric components into the signal head, the control light being disposed in the indicator of the signal head.

In accordance with a concomitant feature of the invention, the control light is a luminescent diode.

Other features which are considered as characteristic for the invention are set forth in the appended claims.

Although the invention is illustrated and described herein as embodied in monitoring and signaling device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 5 is a perspective view of an eccentric unit for transfering the movement of a measuring unit to an indication or display-effecting lever; and FIG. 6 is a diagrammatic elevational view of a monitoring and signaling device in accordance with the invention rotated through 90°.

Like or similarly functioning features shown in the figures of the drawing are identified by the same reference characters.

Figure 1:
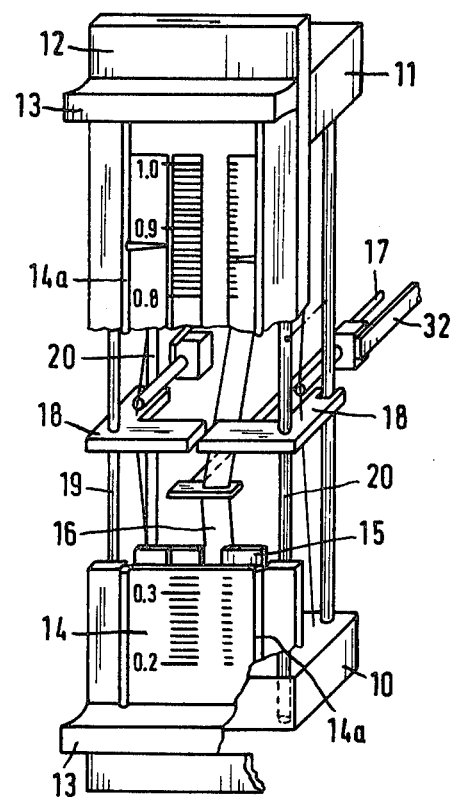
FIG. 1 is a perspective view of the forward part of a signal device of modular or plug-in construction, according to the invention, having a front plate and scale partly broken away so as to expose various details of the construction.

Referring now, more specifically, to FIG. 1, there is shown therein a modular or plug-in signaling device of compact construction with a lower and an upper assembly plate 10 and 11 and an aluminum front plate 12 and two aluminum gripping ledges 13. The rear part of the device and a sheet steel housing of the device have been omitted from FIG. 1 in the interest of clarity and so as to disclose the construction of the device in greater detail. The front plate 12, behind which a glass scale 14 and a screen or diaphragm 15 are disposed, is shown broken-away in the middle thereof to provide insight into the structure of the front region of the device. Behind the diaphragm 15, there runs an indicator or display tape or band 16 in the form of an endless belt of which only the return run or loop is shown in FIG. 1. The tape 16 is connected by a lever 17 with a measuring element or unit not shown in FIG. 1, the lever 17 transfering the movement of the measuring unit to the tape 16.

The tape 16 serves not only for indicating or displaying the measurement value, but also for actuating signal transmitters or sensors of which a respective transmitter is located in a signal head 18. The signal heads 18 are threaded or arranged, respectively, on two bars or rods 19 and 20 which extend parallel to the section of the tape 16 which indicates the measurement value so that the tape is moved in direct vicinity of a signal transmitter integrated into the signal heads 18. Details of the layout of the signal heads 18 and the development thereof are explained hereinafter with respect to the additional figures of the drawing.

The bars or rods 19 and 20 are held above and below in the assembly plates 10 and 11, the lower assembly plate 10 being formed with blind bores and the upper assembly plate 11 with through bores for receiving the rods or bars 19 and 20. The bars 19 and 20 are locked in position in the through bores by respective setscrews.

The signal head 18 is formed of a glass-fiber material and has a through-bore 21 of square cross section formed therein extending in direction of displacement thereof for receiving therein circular bars 19 of a seamless drawn tube having the German Engineering Number (DIN) V4A. A slot 22 is formed in the signal head 18 extending from the through bore 21 to one of the outer sides of the signal head 18. It is possible thereby to make the diameter of the bar 19 slighly larger than the side length of the square cross section of the through-bore 21, so that the signal head 18 is maintained under a given spring bias against the bar 19. The rear side of the signal head 18, as viewed in FIG. 2, is formed as a fork 23 wherein the bar 20 runs, so that the signal head 18 is guided, secure against torsion, by the two bars or rods 19 and 20.

Figure 2:
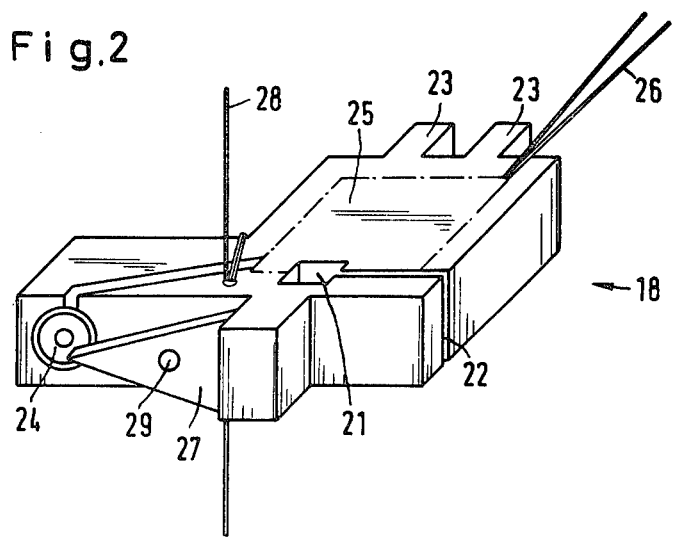
FIG. 2 is an enlarged fragmentary view of FIG. 1 showing one of the signal heads thereof located at the right-hand side of FIG. 1.

A signal transmitter or sensor means 24 in the form of a proximity indicator is embedded or inserted into the front or forward side of the signal head 18, as viewed in FIG. 2, and is electrically connected to an oscillator 25 likewise integrated into the signal head 18. Signal wires 26 lead to a non-illustrated central control device from the output of the oscillator 25. An index or pointer 27 is so formed at the forward side of the signal head 18 as to indicate that nominal value on the scale 14 at which the signal transmitter 24 is responsive.

Figure 3:
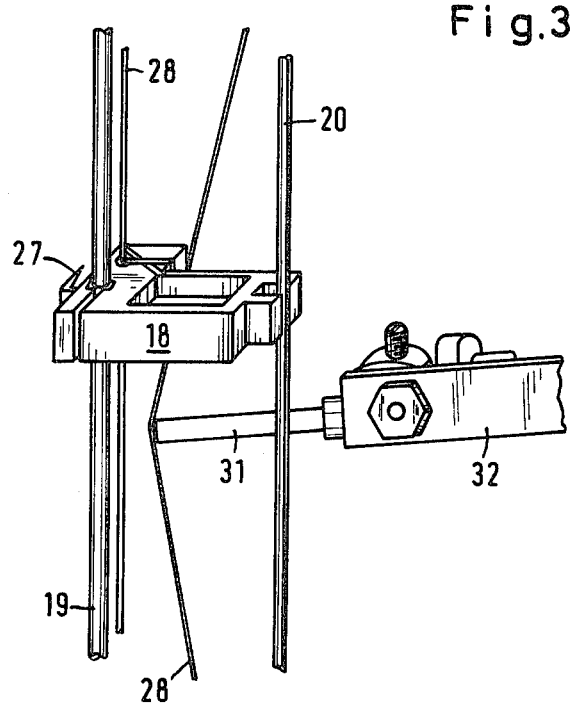
FIG. 3 is a reduced perspective view of FIG. 2 as seen from the right-hand side of the latter figure and showing the signal head arranged or threaded on guide bars as well as a nominal-value lever associated with the respective signal head.
Figure 4:
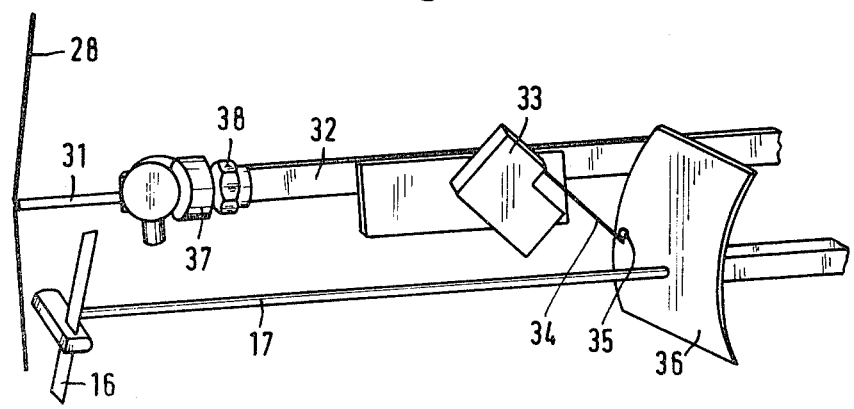
FIG. 4 is another perspective view of the nominal-value lever of FIG. 3 provided with a microswitch as well as with a control surface for actuating the microswitch.

A nylon wire 28 is positively connected to the signal head 18 and extends over upper and lower guides of the tape 16, the nylon wire 18 having end portions thereof which are inserted into a tubular member 31, (note FIGS. 3 and 4), wherein they are fixed by clamping with a lead ball. In this manner, an operationally reliable anchoring of the end portions of the nylon wire or thread 28 is achieved in the most confined or narrowest space. The tubular member 31 represents an axial elongation or extension of a nominal-value lever 32 having the non-illustrated other end thereof mounted in a stationary pivot or center of rotation and carrying, at an intermediate location thereof, a microswitch 33 having an actuating rocker or whip 34 carrying a ball 35 at the end point thereof. The actuating whip 34 is welded to the ball 35 in such manner that the free surface of the ball 35 is not damaged by the welding. During actuation of the microswitch 33, the ball 35 strokes a control surface 36 which is mounted on a lever 17 which transfers the movement of the non-illustrated measuring element or unit to the indicator tape 16. With correct adjustment or setting, the microswitch 33 is thus actuated if the measurement value attains the nominal value set by the signal head 18. As many signal heads 18 as can fit in the available space can be threaded or arranged at both sides of the tape 16 on both rod or bar pairs 19 and 20. A special signaling point or nominal value is then associated or coordinated with each signal head 18 and, when reached, is signaled by the respective signal transmitter 24 and/or the respective microswitch 33.

The tubular member 31 is supported so as to be longitudinally displaceable for varying the length and tension of the nylon wire or thread 28 in the nominal-value lever 32. For fine adjustment of this displacement, the nominal-value lever 32 has a threaded pin or rod whereon a threaded member 37, wherein the tubular member 31 is received, is displaceable in longitudinal direction against the bias of a spring and is fixable in position by a lock nut 38. In the embodiment of the invention according to FIG. 5, the control surface 36 is not directly disposed on the lever 17, but rather, on a separate lever arm 40 firmly connected with the lever 17. That which is special about this embodiment of FIG. 5 is the eccentric unit 50 connecting the non-illustrated measuring unit to the lever 17. To vary the transmission ratio between the travel of the measuring unit and that of the indicator tape 16, a lever arm 51 of the eccentric unit 50 extends into an adjusting member 52 connected to the lever arm 17, the lever arm 51 being shiftable or displaceable in the adjusting member 52 against the bias of a spring 53 by means of an adjusting or lock nut 54 and being lockable therein by means of a setscrew 55. In this relatively simple manner, the outward swing or deflection of the lever 17 for the maximum outward swing or deflection of the non-illustrated measuring unit may be matched exactly to the maximum length of the scale 14.

FIG. 6 shows an embodiment according to the invention with a measuring unit formed of two pressure bellows 60 and 61 having respective free end surfaces firmly connected to one another by a bridge 62. The eccentric unit 50 engages the bridge 62 at the middle thereof, the elongation or extension of the eccentric unit 50 disposed in direction toward the indicator tape 16 being the lever 17.

In the interest of clarity, the device according to the invention is illustrated as having only one signal head 18 with one nominal-value lever 32 appertaining thereto. In the top plan view of FIG. 6, wherein the device according to the invention is shown open, guides 63 and 64 are disposed above and below the measurement-value scale 14, and the tape 16 and the nylon thread 28 run thereover. The guides 63 and 64 are formed of thin-walled tubes of which the tubes 63 are fixed in lateral holders by deformation, while the tubes 64 are resiliently or spring mounted so as to balance or equalize the varying deflection of the band 16 effected by the point or free end of the lever 17 which describes a circular arc and, thereby, promotes or aids in the performance of a linear movement of the indicator tape 16 along the scale 14.

Pins 65 are provided for limiting the travel of the pressure bellows 60, 61 and the bridge 62, respectively, the pins 65 being eccentrically mounted and axially twistable. By twisting the pins 65, the limit of stroke of the pressure bellows 60 and 61 is adjusted. In the position shown in the drawing, the greatest stroke limit is effected, whereas, in the position of the pins 65 turned or twisted through 180°, the smallest stroke limit is affected.

The pins 65 can also be used simultaneously as fastening supports for additional components. If they are provided with an annular groove, they are especially suited as a holder for a printed circuit board.

Should the device according to the invention be equipped with further signal heads 18, without having to shift or displace the previously existing signal heads, the signal heads must not only be slid onto the bars or rods 19 and 20, but can also be snapped open. To this end, the slot 22 in the signal head 18 is made so wide that it is slightly narrower than the cross-sectional diameter of the bars or rods 19 and 20. The elasticity of the material of which the signal head 18 is formed then permits the signal head 18, initially slid with the fork 23 thereof onto the bar 20, to snap open onto the bar 19 through the slot 22 from the side.

On each side of the scale face 14, between the latter and the front housing plate 12, a gap or aperture is provided which is covered by a silicon hose 14a for protection against penetrating dust. To fasten the silicon hoses 14a, a setscrew is tapped into each end portion of each silicon hose and thickens the respective end portion. The thickened end portions are suspended in slits above and below the gap or aperture which are covered by the gripping ledges 13. To adjust or displace the signal heads 18, the silicon hose 14a is pressed to the side and the indicator 27 is shifted by means of a screwdriver into the desired position.

Through the advantageous coordination of the scale face 14, the indicator tape 16 and the signal heads 18 with the indicators 27 thereof, it is possible to change the scale face 14 also during the operation of the device according to the invention.

Because no zero-point indication is available, however, for adjusting the new scale face, in such a case, an auxiliary scale is faintly printed in punctiform on the diaphragm 15 and, with the aid thereof, the correlation between the old and the new scale can be produced. This auxiliary scale is no longer distinguishable beyond a given distance so that it does not disturb the reading of measurement values on the scale face 14 proper.

The signal head 18 can be matched or accommodated, by additional insertion of further components, to all conceivable monitoring tasks. Thus, for example, an amplifier can be installed in addition to or instead of the oscillator 25 and can amplify the signals transmitted by the signal transmitter 24 and feed them to associated outputs at the signal head 18. The signals can, however, also be further made-ready in the signal head 18 and fed to varying outputs. Advantageously, a luminescent diode 29 is disposed in the indicator 27 of the signal head 18 and signals (FIG. 2) the functional proficiency of the electric components built into the signal head 18. Through the insertion of microelectronics, each signal head 18 is able to be disassembled into an independent signaling and/or control and/or regulating unit.

Insofar as the invention of the instant application relates to the cooperation of the signal head 18 with the tape 16 effecting the actuation of the signal transmitter 24, it may also find application in other position-indicating systems, for example in numerical tool machine control. Such applications fall within the range of protection or scope of the invention of the instant application.

There is claimed:

1. Monitoring and signaling device having at least one tape for indicating a measurement value of a measuring unit and for actuating a signal transmitter, the tape having a section thereof stretched over spatially separated guides and having a travel proportional to the measurement value and a coating effecting actuation of the signal transmitter, said signal transmitter being selectively displaceable parallel to the section of the tape extending between the guides, comprising an indicator for indicating a set nominal-value signaling point, said indicator and the signal transmitter being integrated in a signal head, and two bars extending parallel to the section of the tape and carrying adjustably said signal head, the section of the tape being displaceable past the signal transmitter in direct vicinity thereof and between the signal transmitter and said indicator.

2. Device according to claim 1 wherein said signal head is displaceable in direction of said parallel bars and is formed with a through-bore having a polygonal cross section for receiving one of said bars therethrough, said signal head being also formed with a fork through which the other of said bars extends.

3. Device according to claim 2 wherein said signal head is formed with a slot extending from said through-bore to one of the outer sides of said signal head.

4. Device according to claim 1 wherein said signal head is formed of synthetic material, and said bars of spring-hardened, non-corrosive material.

5. Device according to claim 1 wherein said signal head is formed of fibrous plastic material, and said bars of spring-hardened, non-corrosive and seamless drawn tubes.

6. Device according to claim 1 including respective means for holding said bars at upper and lower ends thereof, one of said means being formed with blind bores and the other of said means with through-bores for receiving said bars therein, and including respective setscrews for fixing said bars in said through-bores.

7. Device according to claim 1 wherein a respective pair of said bars is disposed on each side of said tape section, and a plurality of said signal heads being slidable and snappable, respectively, on said bars.

8. Device according to claim 1 including a measurement-value scale face operatively associated with said signal head, said indicator being disposed directly adjacent said scale face.

9. Device according to claim 8 wherein said measurement-value scale face is transparent and is disposed in front of the tape and a diaphragm exposing at least part of said tape section, said scale face having a measurement-value scale printed on a side thereof facing towards the diaphragm.

10. Device according to claim 9 wherein said diaphragm has at least two scale points printed thereon as adjusting aids when scales are exchanged during operation of the device.

11. Device according to claim 8 including a housing front plate spaced from said scale face and defining with the latter a gap therebetween on each side, and an elastic covering disposed over said gap.

12. Device according to claim 11 wherein said elastic covering is a silicone hose.

13. Device according to claim 12 wherein each of said silicon hoses has end portions wherein a pin is received for thickening said end portions, said thickened end portions being suspended in slots above and below said gap for fastening the respective silicon hoses.

14. Device according to claim 13 wherein said pin is a setscrew.

15. Device according to claim 1 wherein the guides are formed of tubes of which at least two are resiliently mounted, the others of the guides being fixed by deformation in respective holders thereof.

16. Device according to claim 1 including a plurality of said signal heads, each of said signal heads being separately connected by a nylon thread to a respective nominal-value lever carrying a nominal-value switch actuatable by the measuring unit, said nylon thread being fastened to said signal head and extending over said guides.

17. Device according to claim 16 wherein said nylon thread is looped multiply about said guides.

18. Device according to claim 16 wherein said nominal-value lever has one end thereof mounted at a fixed center of rotation and, at the other end thereof, has a tubular member forming an axial extension thereof, the ends of said nylon thread being received in said tubular member and clampingly fixed therein by a deformable member so as to form an endless loop.

19. Device according to claim 18 wherein said tubular member is longitudinally shiftable in said nominal-value lever so as to vary the length and tension of said nylon thread.

20. Device according to claim 19 including a threaded member holding said tubular member, said threaded member being displaceable in longitudinal direction on a threaded rod of the nominal-value lever against bias of a spring for finely adjusting the longitudinal shifting of said tubular member, and including a lock nut on said threaded member for fixing said threaded member against unscrewing.

21. Device according to claim 16 including means defining a control surface for actuating said nominal-value switch, said control surface means being disposed on a lever transfering a movement of the measuring unit to said tape.

22. Device according to claim 21 wherein said nominal-value switch has an actuating member with a ball spot-welded thereto which is in stroking engagement with said control surface, said ball having a surface facing toward said control surface which is undamaged by the welding.

23. Device according to claim 21 including an eccentric unit connecting said transfer lever to the measuring unit, said transfer lever having an adjusting member for receiving therein a respective lever arm of said eccentric unit, said lever arm being shiftable by a lock nut in said adjusting member against bias of a spring and being fixable against torsion by a setscrew.

24. Device according to claim 1 including at least one axially twistable and eccentrically mounted pin for limiting travel of the measuring unit.

25. Device according to claim 24 wherein said eccentrically mounted pin has means for simultaneously serving as a fastening support for other components.

26. Device according to claim 1 wherein the signal transmitter is a proximity indicator.

27. Device according to claim 26 wherein said proximity indicator comprises an induction coil.

28. Device according to claim 26 wherein said proximity indicator comprises a Hall element.

29. Device according to claim 26 including an oscillator built into said signal head and electrically connected with said proximity indicator.

30. Device according to claim 26 including an amplifier built into said signal head.

31. Device according to claim 26 wherein said signal head has two outputs from which varying, further processable signals are conductive.

32. Device according to claim 1 including a control light for testing the functioning of electric components built into the signal head, said control light being disposed in said indicator of said signal head.

33. Device according to claim 32 wherein said control light is a luminescent diode.

* * * * *